No. 826,174. PATENTED JULY 17, 1906.
W. A. KÖNEMAN.
WASHING AND DISINTEGRATING APPARATUS.
APPLICATION FILED MAY 1, 1905. RENEWED DEC. 13, 1905.
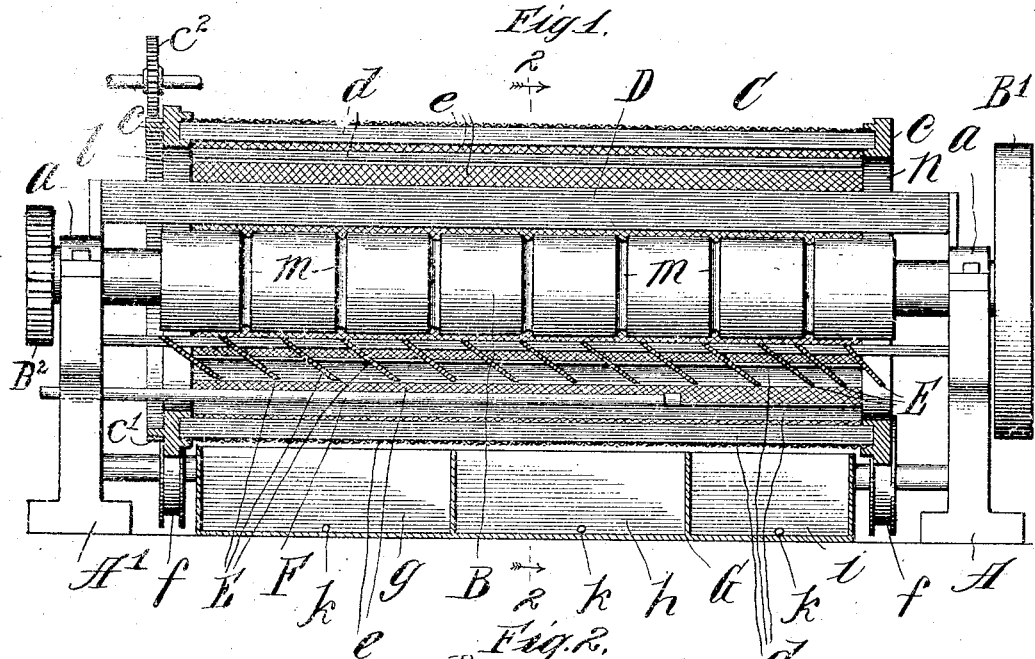
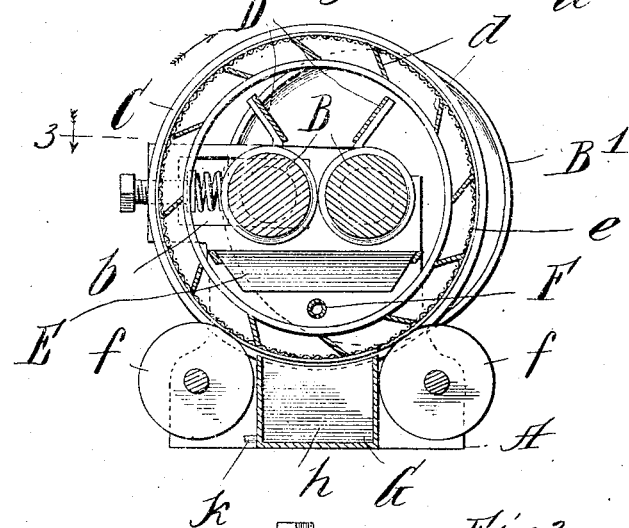
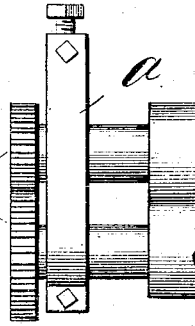
Witnesses:
G. A. Raubenschmidt
Chas. H. Buell
Inventor:
William A. Köneman
By Dyrenforth, Dyrenforth & Lee,
Attys

UNITED STATES PATENT OFFICE.

WILLIAM A. KÖNEMAN, OF CHICAGO, ILLINOIS.

WASHING AND DISINTEGRATING APPARATUS.

No. 826,174.    Specification of Letters Patent.    Patented July 17, 1906.

Application filed May 1, 1905. Renewed December 13, 1905. Serial No. 291,631.

*To all whom it may concern:*

Be it known that I, WILLIAM A. KÖNEMAN, a citizen of the United States, residing at 889 North Ashland avenue, Chicago, in the county of Cook and State of Illinois, have invented a new and useful Improvement in Washing and Disintegrating Apparatus, of which the following is a specification.

The apparatus forming the subject of this invention has been devised by me for use more especially in carrying out the washing and progressive disintegrating steps of a novel process for recovering rubber from rubber waste, which process forms the subject of an application for Letters Patent filed by me on the 16th day of March, 1905, Serial No. 248,647. However, as the apparatus in the same or modified form may be employed to advantage in other connections or rubber-recovering processes I do not limit my improvements to use in any particular connection.

My improved process above referred to consists, briefly and generally stated, in subjecting a mass of rubber waste after it has been preparatorily subjected to disintegration to the action of chemicals in solution for the purpose of decomposing and dissolving fibrous and other undesirable component parts of the mass and also for suitably devulcanizing the rubber constituent which it is desired to recover. In carrying out the said process the mass is preferably subjected to various chemical treatments, as set forth in my aforesaid application, and after each such treatment it is necessary to thoroughly wash the mass to eliminate chemicals and other foreign material. It is also desirable intermediate of the said treatments to subject the mass to further destruction of the cohesion of constituent parts.

My object in devising the present apparatus is to provide a combined washing and squeezing means of improved construction which will carry out the steps of washing and also further disintegration of the mass, if desired, in a particularly thorough and efficient manner.

Referring to the drawings, Figure 1 is a longitudinal section through my improved device; Fig. 2, a section taken on line 2 in Fig. 1, and Fig. 3 a broken plan view on line 3 in Fig. 2 of one end portion of the device or machine.

A A' are end frames provided at their tops with bearings for parallel squeezing-rollers B. The shaft of one of the rollers carries a drive-pulley B' beyond the end frame A, and the other roller B is journaled in suitable spring-pressed journal-boxes $b$, tending to press the said roller yieldingly against the other roller. Beyond the end frame A' the shafts of the rollers are connected in driving relation by gears $B^2$, which may be of unequal diameters, whereby one roller turns at greater speed than the other. Their relative speeds may, for example, be as three to four, or when a squeezing action only is desired the rotation of the rolls may be rendered equal by providing gears $B^2$ of equal diameters.

Surrounding the pair of rollers is a receptacle or casing C, which I prefer to provide in the form of a cylinder or drum open at both ends. The drum consists of end rings $c$ $c$, grooved on their inner faces to receive the ends of slats $d$ or the like each at an angle, as indicated, to a right line drawn from the center to the periphery of the drum. Extending around the slats and fastened at opposite ends to the rings $c$ is a cylindrical screen $e$, which may be approximately forty mesh or of such fineness as required. The drum may rest at its rings $c$ in grooved rollers $f$, as indicated, and be rotated on the said bearings (in the direction of the arrow, Fig. 2) by any suitable driving means—as, for example, the gear $c'$ and pinion $c^2$. Within the drum above the bite of the rollers B are longitudinally-extending inclined deflector-plates, forming between them a hopper D, as shown. Also within the drum beneath the rollers is a series of cross extending inclined deflector-plates E, which may be disposed as shown. Extending from the receiving end of the drum, beneath the rollers more or less nearly to the discharge end of the drum, is a perforated water-supply pipe F, and beneath the drum is a trough G, which may be divided transversely, as shown, into three compartments $g$ $h$ $i$, having separate drainage-outlets $k$.

The mass of material undergoing treatment is fed by any suitable means into the open end $l$ of the drum. The slats $d$ operate as buckets which in the rotation of the drum lift the material from beneath the rollers B and discharge it into the hopper D. The hopper directs the material into the bite of the rollers B, and if the latter rotate at different speeds the material is subjected to a tearing as well as a squeezing action. Each roller is provided with a series of circumferential grooves $m$, which facilitate the escape of liquid squeezed from the material downward over the deflector-plates E to the lower part of the revolving screen and through the latter to the trough G. As the material is discharged through the rollers it drops onto the deflectors E and is thereby advanced toward the discahrge end n of the drum, being subjected to the stream of water discharged from the pipe F. The material after it has been fed into the receiving end of the drum is raised by the buckets, fed thereby to the rolls, and as it is discharged by the rolls is advanced step by step. It is thus subjected to squeezing to eliminate solution, surplus water, and foreign matter carried thereby, is further disintegrated by the tearing action of the rolls, and may also be again saturated with water at each step. The rubber constituent of the mass is in granular particles too large to pass through the meshes of the drum. Decomposed or partly-decomposed fibrous portions of the mass and other foreign substances will pass readily through the screen under the action of the escaping solution and washing operation produced by the water. The first compartment g will catch the solution of the chemicals employed in the previous step of the process. In the next compartment h the washings and dilute solution will be caught, and the final compartment i catches the final washings. The liquid thus caught in the compartments is of decreasing chemical strength and may as far as desired be saved and used again. As the material is advanced beyond the end of the pipe F it is subjected to no further washing operations; but the rollers operate to further disintegrate the material and cause it to be discharged in a condition free from surplus water onto the final deflector-plate E, which directs it through the discharge end of the drum. When discharged, the mass will be thoroughly washed of all chemicals employed in the last previous treatment.

While I prefer to construct the apparatus as shown and described, the drum or other suitable casing may, if desired, be stationary and provided with a screen along its lower side. In that event the buckets formed by the slats d or otherwise would be mounted independently in the drum to rotate and preferably scrape lightly against the inner surface of the drum as they rotate to raise and discharge the material into the rollers. By inclining the drum from the inlet to the outlet end thereof the deflector-plates E may be dispensed with.

What I claim as new, and desire to secure by Letters Patent, is—

1. In a machine for the purpose set forth, the combination of a casing having an inlet for the material to be acted upon and an outlet therefor, squeezing mechanism for the material extending within the casing between the said inlet and outlet, raising means in the casing operating to lift the material and feed it to the squeezing mechanism, means for supplying water to the material in the casing, and means operating to advance the material from the inlet to the outlet.

2. In a machine for the purpose set forth, the combination of a casing having an inlet for the material to be acted upon and an outlet therefor, rotary squeezing-rollers for the material extending longitudinally within the casing between said inlet and outlet, raising means in the casing operating to lift the material and feed it to the squeezing-rollers, means for supplying water to the material in the casing, and means operating to advance the material, between the squeezing operations, from the inlet to the outlet.

3. In a machine for the purpose set forth, the combination of a casing having an inlet for the material to be acted upon and an outlet therefor, squeezing and disintegrating mechanism for the material extending longitudinally within the casing between said inlet and outlet, raising means in the casing operating to lift the material and feed it to the said mechanism, means for supplying water to the material in the casing, and means operating to advance the material from the inlet to the outlet.

4. In a machine for the purpose set forth, the combination of a casing having an inlet for the material to be acted upon and an outlet therefor, coöperating squeezing and disintegrating rollers for the material rotating at relatively different speeds and extending within the casing between said inlet and outlet, raising means in the casing operating to lift the material and feed it to the said rollers, means for supplying water to the material in the casing, and means operating to advance the material, between squeezing and disintegrating operations, from the inlet to the outlet.

5. In a machine for the purpose set forth, the combination of a drum having an inlet for the material to be acted upon and an outlet therefor, squeezing mechanism for the material extending longitudinally within the drum between the said inlet and outlet, revolving buckets on the inner circumferential surface of the drum operating to lift the material and feed it to the squeezing mechanism, means for supplying water to the material in the drum, and means operating to advance the material from the inlet to the outlet.

6. In a machine for the purpose set forth, the combination of a rotary perforate drum having an inlet for the material to be acted upon at one end and an outlet therefor at its opposite end, coöperating squeezing and disintegrating rollers for the material rotating at relatively different speeds and extending within the drum between said inlet and outlet, buckets on the inner circumferential surface of the drum operating to lift the material and feed it to the said rollers, means for supplying water to the material in the drum, and stationary inclined deflector-plates in the drum, beneath the rollers, operating to advance the material, between the squeezing and disintegrating operations, step by step from the inlet to the outlet.

7. In a machine for the purpose set forth, the combination of a rotary perforate drum having an inlet for the material to be acted upon and an outlet therefor, coöperating squeezing-rollers for the material extending longitudinally within the drum between said inlet and outlet, a longitudinally-extending hopper in the drum above the bite of the rollers, raising means in the drum operating to lift the material from beneath the rollers and discharge it into the hopper, means for supplying water to the material in the drum, and means operating to advance the material, between the squeezing operations, from the inlet to the outlet.

8. In a machine for the purpose set forth, the combination of a rotary perforate drum having an inlet for the material to be acted upon and an outlet therefor, squeezing mechanism for the material extending longitudinally within the drum between said inlet and outlet, raising means in the drum operating to lift the material and feed it to the squeezing mechanism, means for supplying water to the material in the drum, means operating to advance the material from the inlet to the outlet, and a trough beneath the drum extending between the said inlet and outlet and divided transversely into a plurality of compartments, substantially as and for the purpose set forth.

WILLIAM A. KÖNEMAN.

In presence of—
J. H. LANDES,
A. U. THOUEN.